United States Patent [19]

Greaux

[11] 4,380,883
[45] Apr. 26, 1983

[54] FISHING SIGNAL APPARATUS

[76] Inventor: Edward Greaux, 390 New Brunswick Ave., Perth Amboy, N.J. 08861

[21] Appl. No.: 222,349

[22] Filed: Jan. 5, 1981

[51] Int. Cl.³ ........................................... A01K 97/12
[52] U.S. Cl. ...................................................... 43/17
[58] Field of Search ..................... 43/17, 25; 24/248 B, 24/249 R, 250, 257, 258; 248/74 B, 74 PB, 251; 403/188, 396; 116/67 R

[56] References Cited

U.S. PATENT DOCUMENTS

| | | | |
|---|---|---|---|
| 807,405 | 12/1905 | Stirling | 24/248 B |
| 2,641,079 | 6/1953 | Oster | 43/17 |
| 2,921,399 | 1/1960 | Huliew | 43/17 |
| 3,057,438 | 10/1962 | Wanner et al. | 403/188 |
| 3,401,479 | 9/1968 | Keyes | 43/16 |
| 3,739,435 | 6/1973 | Baker | 24/257 R |
| 3,814,048 | 6/1974 | Bartholomew | 43/17 |

Primary Examiner—Nicholas P. Godici
Assistant Examiner—M. Jordan
Attorney, Agent, or Firm—Robert D. Farkas

[57] ABSTRACT

A fishing signal apparatus utilizes a detachable clamping mechanism which may be affixed at selected locations along the length of a hand-held type fishing rod and reel. The clamping mechanism has a spring wire affixed thereto. The other end of the spring wire is configured to prohibit a bell mechanism from accidental disengagement with the spring wire. The bell mechanism may be adjusted to clampingly reside at selected locations along the length of the spring wire. By adjusting the location of the clamping mechanism and the location of the bell mechanism, wave and wind action can be eliminated as a means of ringing the bell, while minor non-biting forces, acting on the fishing tackle, can also be disregarded.

10 Claims, 5 Drawing Figures

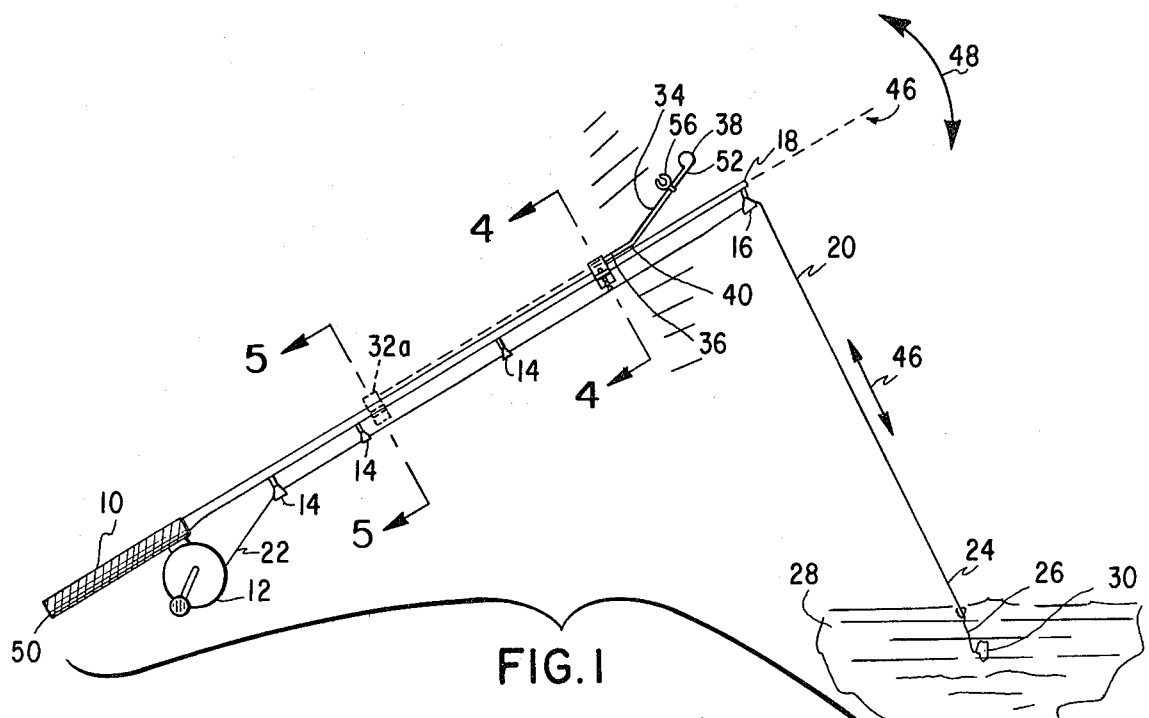
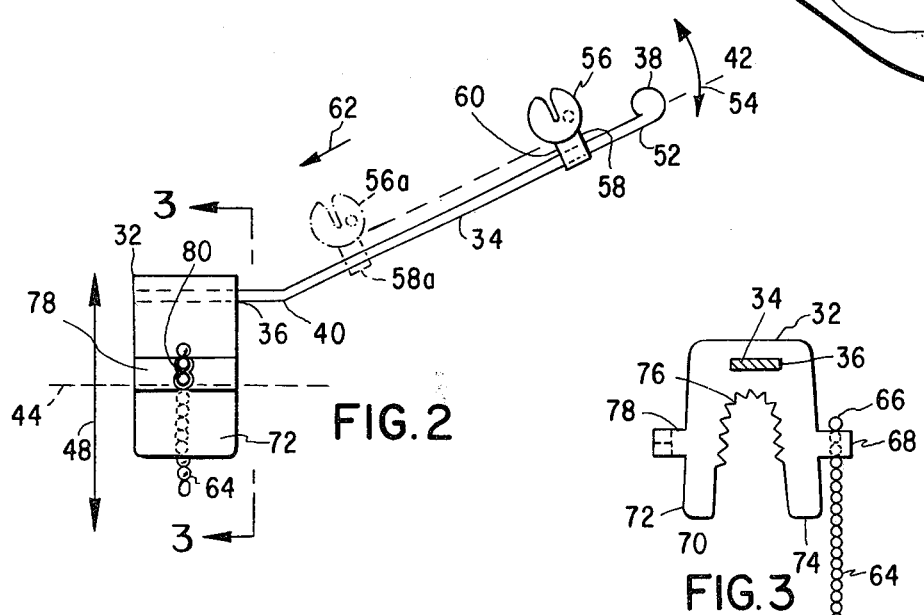
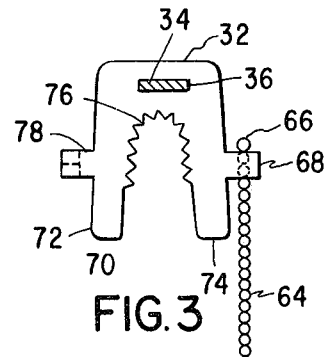
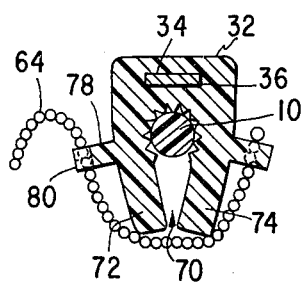
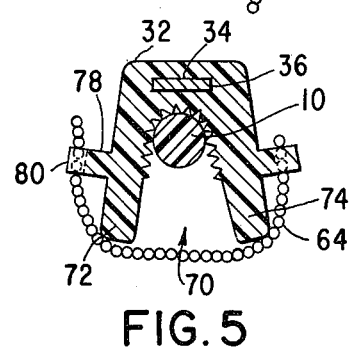

FISHING SIGNAL APPARATUS

BACKGROUND OF THE INVENTION

1. The Field of the Invention

The invention relates to signal equipped fishing devices, and more particularly to that class of signaling device which may be removeably attached to a hand-held fishing rod.

2. Description of the Prior Art

The prior art includes two basic varieties of signaling devices. The first such variety, typically described as a fishing apparatus, other than a hand-held fishing rod, is shown in U.S. Pat. No. 2,693,045, issued Nov. 2, 1954 to A. J. John. Here, the apparatus is secured to a wooden supporting mechanism by a wood screw. The apparatus consists of a line receiving portion, having a trigger mechanism. When the line is pulled, the trigger mechanism is released, such that a spring loaded arm, carrying a bell, is set into motion. The John apparatus in essence is a combination stationary positioned, non-hand-held, fishing apparatus having a bell-like signal fixed thereto, such that when a bite occurs, the bell is actuated and the line is retained against further motion.

Included in the same class as the patent to A. J. John, are the teachings of J. L. Meszaros, under U.S. Pat. No. 1,516,484 issued Nov. 18, 1924, the teachings of T. T. McCurley, under U.S. Pat. No. 1,729,646, issued Oct. 1, 1929, the teachings of L. Dahlgren, under U.S. Pat. No. 2,924,038, issued on Feb. 9, 1960, and the teachings of I. Bushong, under U.S. Pat. No. 449,202, issued Mar. 31, 1891.

The patent to W. J. Keyes, bearing U.S. Pat. No. 3,401,479, issued Sept. 17, 1968, illustrates the other class of fishing devices having signals thereon, to wit, a hand-held fishing rod bearing a bell mechanism, actuated upon the line being tensioned due to a fish bite. In actuality, the Keyes teaching shows a hand-held fishing apparatus, or pole, whose proximal and resides in a socket. The socket is adapted for attachment to the earth or to a vessel structure. Also attached to the socket is a bell mechanism which is spring loaded for release upon the line, being tensioned due to a fish bite. If the Keyes apparatus were to be utilized, as a hand-held apparatus, socket and all, then, the bell mechanism would ring upon a fish bite. However, as can be seen, the trigger mechanism of Keyes is fixed as to the amount force required to activate same. In such condition, only a bite of a given magnitude will cause the bell to ring.

SUMMARY OF THE INVENTION

A primary object of the present invention is to provide a fish bite signaling device, for ready removal and detachment to conventional fishing poles, when desired.

Another object of the present invention is to provide a fish bite signaling device whose activation may be controlled by the user, thereby eliminating unwanted oft-times experienced tugs on the line from causing the signaling device to activate.

Still another object of the present invention is to provide a signaling device which can be adjusted for response to slow frequency forces being exerted on the fishing tackle as well as providing an adjustment for fast acting forces.

Yet another object of the present invention is to provide an apparatus which can "tune out" unwanted vibrations, whilst permitting the signaling apparatus perfectly active for purposes of detecting fish bites of selected magnitudes.

A further object of the present invention is to provide a fish signaling apparatus of inexpensive construction, durable life, and having a compact size.

Heretofore, fish signaling apparatuses have been extremely complicated, cumbersome, and comprise another piece of equipment which the fisherman must carry about. The devices currently available are limited in their ability to reject slow moving forces reflecting wind and wave action. In order to do so, such mechanisms frequently fail to adequately signal a modest intensity, high frequency course, experienced when a small or large fish bites the bait. Further, most fish bite signaling devices interfere with the line travel, during paying out or reeling in of the line. They often require an extra operation in threading the line, through loops, bites, or clamp-like fingers to activate the fish signaling device. When attached to handheld fishing rods, other signaling devices comprise a substantial mass and weight, and are unwieldy.

The present invention contemplates these problems, and provides an inexpensive detachable mechanism for affixment to any portion of the length of a fishing rod, generally located between the reel clamp and the tip of the rod, to which a bell mechanism is supported, at selected locations along the length of a spring wire. In the fashion, the clamping mechanism can be located near the reel, thus moderating the intensity of the vibrations experienced by the clamping mechanism, and, in the main, causing an overall attenuation in the ability of the bell to ring, for a force exerted on the fishing line, threaded in conventional fashion. By moving the bell away from the clamping mechanism, the bell becomes more responsive to vibrations felt by the clamping mechanism and can be tuned to vibrate in sympathy with the frequency of high frequency forces, normally experienced during an actual fish bite. Thus, the user can't "detune" slow acting forces and increase the effect of high frequency biting forces, so as to provide a loud clear signal mostly when biting actually occurs, eliminating unwanted sounds when there is no actual activity, caused by a biting fish.

These objects as well as other objects of the present invention, will become more readily apparent after reading the following description of the accompanying drawings.

BRIEF DESCRIPTION OF THE DRAWINGS

FIG. 1 is a side elevation view of the present invention shown having the hook portion thereof immersed in a body of water.

FIG. 2 is a side elevation view of a portion of the apparatus shown in FIG. 1.

FIG. 3 is a side elevation view, taken along lines 3—3, viewed in the direction of arrows 3—3, of a portion of the apparatus shown in FIG. 2.

FIG. 4 is a side elevation, cross sectional view, taken along lines 4—4, viewed in the direction of arrows 4—4, of a portion of the apparatus shown in FIG. 1.

FIG. 5 is a side elevation, cross sectional view, taken along lines 5—5, viewed in the direction of arrows 5—5, of a portion apparatus shown in FIG. 1.

DESCRIPTION OF THE PREFERRED EMBODIMENT

The structure and method of fabrication of the present invention is applicable to fishing signal apparatuses, of the class of apparatus that is intended to be removeably secured to conventional fishing poles, and for use when such fishing poles are hand-held or have the hand-holding portion thereof secured in a pole holding device. The present invention contemplates the use of a removeable clamp, which is slideably affixed to portions of the fishing rod, generally in between the locale of the tip of the rod and the location where the reel is affixed to the rod. The preferred embodiment of the invention utilizes a rubber-like block for the clamping mechanism. Such rubber-like block is provided having a slot whose interior surface is equipped with serrations, for better gripping ability on the exterior surface of the rod. The legs of the block, adjacent the mouth of the slot, are bendable inwards, such that route of the slot may be configured to grasp the generally wider portions of the rod, adjacent the reel, as well as the narrower portions of the rod, found adjacent the tip of the rod. The block provided with a locking mechanism, adapted to pull together, the leg portions, made of resilient rubber-like material, such as rubber or a plastic material, such as polyvinyl chloride. The locking mechanism can be a bead chain, one end of which, is affixed to a protrusion on an outer surface of one of the legs. Another protrusion is affixed to the outer surface of the other leg and is adapted with a socket for receiving the bead chain therein. In use, the rubber block is moved to a preferred position, with the bead chain released from engagement with the socket. Then, the bead chain is pulled taut, towards the socket carrying protrusion. The bead chain is engaged with the socket, causing both legs to bend towards each other, and effectively clamp thereby, a small portion of the rod upon which the serrated edges of the slot reside. The bead chain may be metallic, preferably being fabricated from brass or other high strength materials, and preferably covered with a rust resistant plating, such as nickel or chromium.

The rubber clamping mechanism is provided having a passageway therein, such passageway having a longitudinal axis adapted to reside parallel to the longitudinal axis of the fishing rod, when the rubber block is locked thereon. The passageway is configured to hold therein, in fixed fashion, one end of a spring wire mechanism. Such spring wire mechanism is flat, made from steel, and covered with a rust resistant coating, such as black oxide. Alternatively, the spring mechanism may be round, such as piano wire. The material used, for any spring wire, may be fabricated from a resilient metal, such as phosphor bronze, suitably plated to prevent rust. The end of the spring wire that is attached to the block is affixed in such a way as to prevent removal or a sliding fit. Any adhesive, well known in the art, may be utilized for this purpose.

The other end of the spring wire is configured to have a thickness greater than the cross sectional thickness of the remainder of the spring wire. This may be accomplished by dipping the free end of the spring wire into a molten lead bath, thereby causing a ball-like protrusion to permanently reside at the free end of the spring wire. Alternate techniques may include bending the spring wire sharply, in the form of a loop or a right angle bend.

A bell mechanism, of any type, may be employed for slideable attachment on the spring wire. In the preferred embodiment, a unitary hollow ball-like mechanism is employed as the bell, having therewithin, a metallic ball. The bell housing is slideably affixed to the spring wire, utilizing a portion of the bell housing which grasps the exterior surface of the spring wire, and requires considerable force to locate the bell at a preferred location along the length of the spring wire. I have utilized a conventional sphere-like bell, having a strap-like protrusion, extending outwardly from the bell mechanism, such that the strap mechanism encircles the spring wire and permits the bell to be adjusted along the length of the spring wire.

The spring wire is provided having a small bend, located intermediate the free end of the wire, and the end thereof that is secured to the rubber clamping mechanism. The free end is bent upwardly and outwardly from the longitudinal axis of the route of the slot, so as to permit the free end of the spring wire to reside furthest away from the longitudinal axis of the fishing rod, when the clamping mechanism is affixed thereto. In use, the free end of the spring wire is located on a side opposite the location of the lines supporting loops, which loops are permanently affixed to the fishing rod.

The apparatus as shown, comprises fishing rod 10, having reel 12 thereon. Loops 14 are shown along the length of the rod. Loop 16 is located adjacent free end 18 of rod 10. Fishing line 20 is shown passing through loops 14 and 16, having portion 22 thereof located adjacent reel 12 and portion 24 thereof located adjacent hook 26, shown beneath the surface of the body of water 28. Hook 26 carries bait 30 thereon.

Clamping mechanism 32 is shown attached to rod 10, in FIG. 1, intermediate loops 14 and 16. Spring wire 34 is shown having end 36 thereof attached to clamping mechanism or block 32. Ball-like protrusion 38 is shown located at the free end of spring wire 34. Bend 40 is shown located adjacent mechanism 32, such that longitudinal axis 42, of spring wire 34, is disposed upward and away from longitudinal axis 44 of clamping mechanism 32 and longitudinal axis 46, of fishing rod 10. When a biting force, experienced on bait 30, acts on line 20, such biting force is translated into forces acting on line 20, in the direction of arrows 46. When this occurs, end 18 of fishing rod 10, tends to vibrate in the direction of arrows 48, provided the end 50, of fishing rod 10, is held in a near or in a stationary condition. Similarly, clamping mechanism 32 will vibrate in the direction of arrows 48. Such vibrations will tend to cause end 52, of spring wire 34, to vibrate in the direction of arrows 54.

Bell 56 is shown having a clamping device 58, secured to spring wire 34. The clamping mechanism comprises hole 60, which encircles spring wire 34. Applying a force in the direction of arrow 62 to bell 56, causes bell 56 to move to the position shown by dotted lines 56A and 58A, and to reside there, until a manual force is applied to the bell described by dotted lines 56A, causing the bell to be purposely manually repositioned to another preferred location.

As can be seen, vibrating rubber-like block 32, substantially upwardly and downwardly, in the direction of arrows 48, as shown in FIG. 2, causes end 36 of wire member 34 to move in a similar fashion. However, end 52 of wire member 34 will move at a different rate and intensity, dependent upon the location of bell 56 and clamping mechanism 58, along the location of spring wire 34. Additionally, bell 56 may move at a different frequency, because of the natural period of vibration of the mechanism of the apparatus including spring wire 34 and bell 56. Thus, different frequencies and different intensities of sounds may be heard, when different intensity of forces are exerted in the direction of arrows 46, dependent upon the location of bell 56 along the length of spring wire 34, as well as the location of clamp mechanism 32 along the length of fishing rod 10.

Bead chain 64 is shown having end 66 captured within protrusion 68. Slot 70 is shown located in block 32, intermediate legs 72 and 74. Serrations 76 are located in the interior portion of slot 70, as shown in FIG. 3. Protrusion 78, shown located on an exterior surface of leg 72, is adapted having openings 80 therein. Openings 80 are configured to clampingly retain portions of bead chain 64, manually inserted therein, prohibiting the bead chain, when so engaged, from slideable movement along its length, relative to protrusion 78.

FIG. 4 illustrates legs 72 and 74 brought together in near proximate relationship, at their free ends, when a portion of fishing rod 10, having a small diameter, is clamped, and by the ability of the free end of legs 72 and 74 to come together, due to the small diameter of fishing rod 10 so clasped.

FIG. 5 illustrates another portion of fishing rod 10 clasped, wherein such portion of the rod has a large diameter than the portion of the rod as shown in FIG. 4.

Dotted lines 32A, shown in FIG. 1, represent an alternate location of block 32, for the location shown. Obviously, block 32, when removed from fishing rod 10, permits fishing rod 10 to be utilized in its conventional fashion, but without a fishing signal apparatus attached thereto. Clamping block mechanism 32 may be affixed at any location intermediate end 18, and the location of the clamping portion of reel 12, along the length of fishing rod 10. If desired, spring wire 34 may be fabricated from a circular cross section spring wire, which in turn may be fabricated from any resilient metallic or plastic material, such as rigid polypropylene, or the like.

One of the advantages of the present invention is a fish bite signaling device, for ready removal and detachment to conventional fishing poles, when desired.

Another advantage of the present invention is a fish bite signaling device whose activation may be controlled by the user, thereby eliminating unwanted ofttimes experienced tugs on the line from causing the signaling device to activate.

Still another advantage of the present invention is a signaling device which can be adjusted for response to slow frequency forces being exerted on the fishing tackle as well as providing an adjustment for fast acting forces.

Yet another advantage of the present invention is an apparatus which can "tune out" unwanted vibrations, whilst permitting the signaling apparatus perfectly active for purposes of detecting fish bites of selected magnitudes.

A further advantage of the present invention is a fish signaling apparatus of inexpensive construction, durable life, and having a compact size.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

The embodiment of the invention in which an exclusive privilege or property is claimed are defined as follows:

1. A fishing signal apparatus comprises a block, means to clampingly releasably and slideably engage said block to selected portions of the length of a fishing rod adjacent its distal most end, said means to engage said block including said block having a slot therein, said slot having a longitudinal axis, said longitudinal axis of said slot being configured to be coaxially aligned with the longitudinal axis of said fishing rod when said block is installed at any location along the length of said fishing rod, a spring wire, one end of said spring wire fixedly secured to said block, said spring wire having a bend, said bend being located intermediate said block and the free end of said spring wire, whereby said free end of said spring wire is disposed upwardly and outwardly from said longitudinal axis of said slot, whereby said spring wire resides in a plane, said longitudinal axis of said slot passing through said plane, a bell, means to clampingly slidingly engage said bell to selected portions of the length of said spring wire.

2. The apparatus as claimed in claim 1 further comprising means to prevent said bell from slideable disengagement from said spring wire.

3. The apparatus as claimed in claim 2 wherein said means to prevent disengagement comprises a protrusion extending outwardly from the exterior surface of said spring wire at the free end thereof.

4. The apparatus as claimed in claim 1 comprising said slot having serrations on the interior surface thereof, a bead chain, said bead chain having one end thereof fixedly secured to said block, said block having a bead chain receiving opening therein, whereby portions of said bead chain may be received within said opening, means to alter the shape of said slot.

5. The apparatus as claimed in claim 4 wherein said bead chain resides in a plane when said bead chain is disposed having a portion thereof residing in said opening, said plane being normal to the longitudinal axis of said slot.

6. The apparatus as claimed in claim 1 wherein said spring wire comprises a resilient spring-like material.

7. The apparatus as claimed in claim 6 wherein said material comprises a spring steel.

8. The apparatus as claimed in claim 6 wherein said material comprises a plastic.

9. The apparatus as claimed in claim 1 wherein said block comprises rubber.

10. The apparatus as claimed in claim 1 wherein said bell comprises a hollow spherical bell-like structure.

* * * * *